United States Patent [19]
Uyama et al.

[11] Patent Number: 6,003,425
[45] Date of Patent: Dec. 21, 1999

[54] BOOSTER

[75] Inventors: Shintaro Uyama; Kazuhisa Miyagawa, both of Saitama-Ken, Japan

[73] Assignee: Jidosha Kiki Co., Ltd., Tokyo, Japan

[21] Appl. No.: 09/262,465

[22] Filed: Mar. 4, 1999

[30] Foreign Application Priority Data

Mar. 27, 1998 [JP] Japan .................................. 10-100590

[51] Int. Cl.⁶ .................................................. F15B 9/10
[52] U.S. Cl. ........................................ 91/369.2; 91/376 R
[58] Field of Search ............................... 91/369.1, 369.2, 91/376 R

[56] References Cited

U.S. PATENT DOCUMENTS

| | | |
|---|---|---|
| 4,718,328 | 1/1988 | Mori et al. . |
| 5,386,760 | 2/1995 | Goto et al. . |
| 5,537,910 | 7/1996 | Watanabe . |
| 5,609,087 | 3/1997 | Horikoshi . |
| 5,761,983 | 6/1998 | Gotoh et al. . |
| 5,802,951 | 9/1998 | Satoh et al. . |

*Primary Examiner*—Hoang Nguyen
*Attorney, Agent, or Firm*—Flynn, Thiel, Boutell & Tanis, PC

[57] ABSTRACT

A plurality of axially extending ribs are formed in the inner periphery of a valve body at its front end for slidably supporting the outer peripheral surface of the output shaft at its rear end. With this arrangement, any dimensional error which may occur in the region of the ribs can be suppressed small during the manufacturing of the valve body if a diameter shrinkage occurs in the inner periphery thereof. Accordingly, when the rear end of the output shaft is slidably fitted into the ribs, the output shaft is less likely to be askew with respect to the axis of the valve body. Accordingly, a biased abrasion of an annular seal member which is disposed between an opening formed in the front portion of a shell and the outer periphery of the output shaft at its front end to maintain a hermetic seal therebetween can be suppressed.

8 Claims, 2 Drawing Sheets

BOOSTER

FIELD OF THE INVENTION

The invention relates to a brake booster, and more particularly, to an improvement of the inner periphery of a valve body fitted around one end of an output shaft.

DESCRIPTION OF THE PRIOR ART

A booster is known in the art which comprises a substantially tubular valve body slidably disposed within a shell, and an output shaft having a rear end, the outer peripheral surface of which is slidably fitted into the inner periphery of the valve body at its front end.

The valve body is moulded from a thermosetting material such as synthetic resin, for example, in the conventional practice. During the moulding process, a diameter shrinkage may occur in the internal peripheral surface of the valve body. When the outer periphery of the rear end of the output shaft is fitted into the inner periphery of the valve body which has experienced such a diameter shrinkage, there results a biased abutment between sliding portions of the both members. This may cause the axis of the output shaft to be disposed askew with respect to the axis of the valve body accompanying a reciprocating motion of the output shaft under such condition. An annular seal member is disposed between the outer periphery of the output shaft at its front end and an opening formed in the wall of the shell, and may be subject to a biased abrasion to cause a leakage through the hermetic seal during the reciprocating motion of the output shaft in an askew condition.

SUMMARY OF THE INVENTION

In view of the foregoing, in a booster comprising a substantially tubular valve body slidably disposed within a shell, and an output shaft having a rear end, the outer peripheral surface of which is slidably fitted into the inner periphery of the valve body at its front end, in accordance with the invention, the inner periphery of the valve body is provided at its front portion with a plurality of axially extending ribs to support the outer peripheral surface of the output shaft at its rear end in a slidable manner.

With this arrangement, in the region of the plurality of ribs, the valve body is less susceptible to the occurrence of a diameter shrinkage during the moulding process of the valve body, thus reducing a tolerance error in the internal diameter of the plurality of ribs as compared with the use of a smooth cylindrical surface for the inner periphery.

Consequently, when the rear end of the output shaft is slidably supported by the plurality of ribs, it is possible to reduce a biased abutment which may occur between sliding portions of the outer periphery of the output shaft at its rear end and the plurality of ribs while simultaneously suppressing an askew condition of the axis of the output shaft with respect to the axis of the valve body. This allows a biased abrasion of the seal member which maintains the hermetic seal between the opening in the wall of the shell and the outer periphery of the output shaft at its front end to be suppressed.

Above and other objects, features and advantages of the invention will become apparent from the following description of an embodiment thereof with reference to the attached drawings.

DETAILED DESCRIPTION OF THE EMBODIMENT

Figure 1:
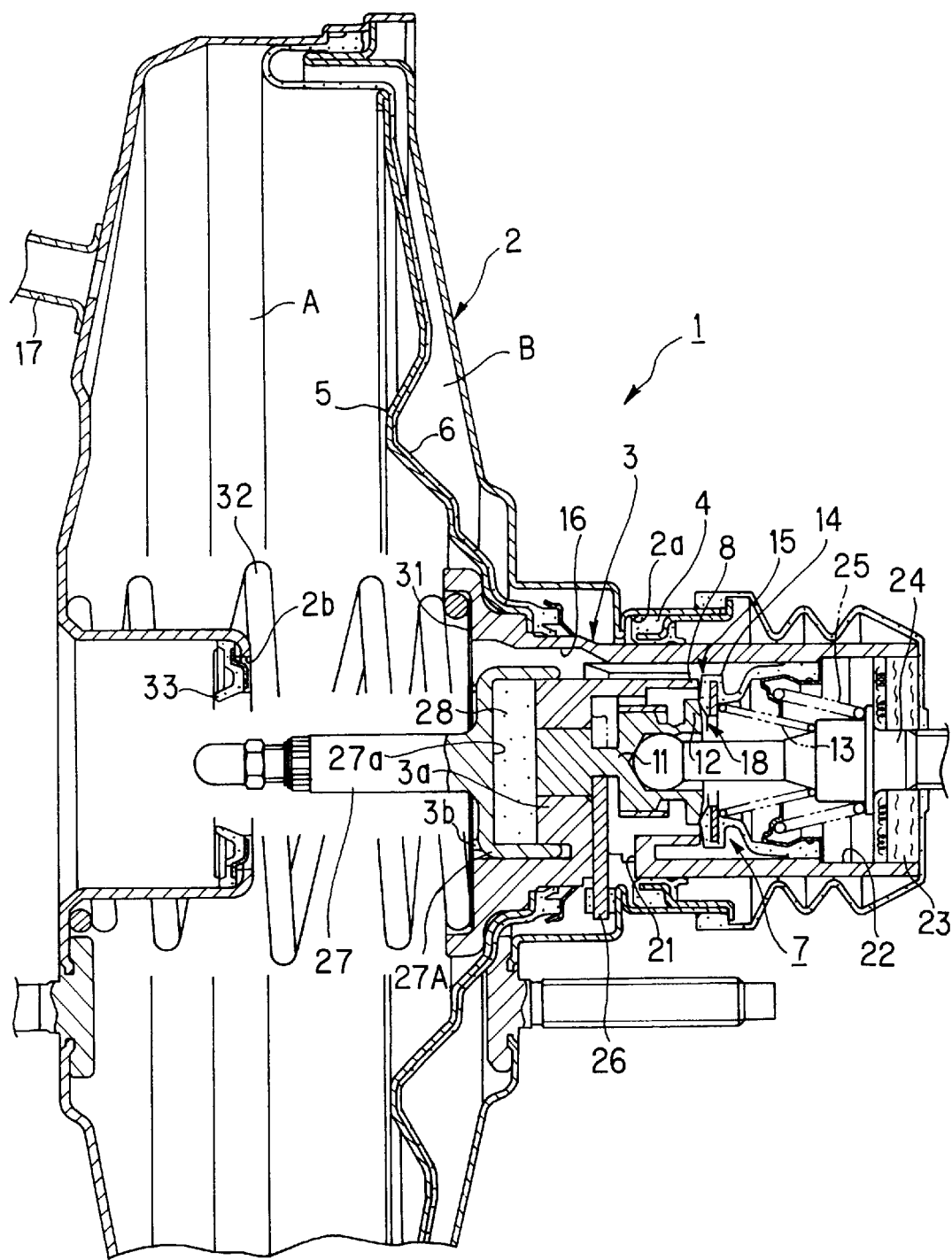
FIG. 1 is a cross section of one embodiment of the invention.

Referring to the drawings, one embodiment of the invention will be described. Referring to FIG. 1, a brake booster 1 includes a shell 2 in which a substantially tubular valve body 3 is slidably disposed, the outer periphery of a rear portion of the valve body 3 extending through a rear opening 2a of the shell 2 to the exterior of the shell 2. An annular seal member 4 is disposed between the outer periphery of the valve body 3 at its rear end and the opening 2a in the shell 2 to maintain a hermetic seal.

A substantially dish-shaped power piston 5 is connected around the outer periphery of the valve body 3, and a diaphragm 6 is applied to the back surface of the power piston 5. In this manner, the interior of the shell 2 is divided by the diaphragm 6 into a forwardly located constant pressure chamber A and a rearwardly located variable pressure chamber B.

A conventional valve mechanism 7, which is known in itself, is disposed within the valve body 3 for switching the communication between the constant pressure chamber A and the variable pressure chamber B. The valve mechanism 7 comprises an annular vacuum valve seat 8 formed on the inner periphery of the valve body 3, a valve plunger 11 slidably fitted into the valve body 3, an annular atmosphere valve seat 12 formed on the rear end of the valve plunger 11, and a valve element 14 urged by a spring 13 from the rear side to be seated upon either valve seat 8 or 12.

A combination of the vacuum valve seat 8 and a seat area on the valve element 14 which moves into the engagement with or disengagement from the valve seat 8 defines a vacuum valve 15. A space located radially outward of the vacuum valve 15 communicates with the constant pressure chamber A through constant pressure passages 16 (FIGS. 1 and 3) formed in the valve body 3. The interior of the constant pressure chamber A (FIG. 1) communicates with a source of negative pressure through a tubing 17 which introduces a negative pressure, whereby the negative pressure is normally maintained in the constant pressure chamber A.

A combination of the atmosphere valve seat 12 and a seat area on the valve element 14 which moves into engagement or disengagement from the valve seat 12 defines an atmosphere valve 18. A space located between the vacuum valve 15 and the atmosphere valve 18 communicates with the variable pressure chamber B through a radial variable pressure passage 21 formed in the valve body 3.

A space located radially inward of the atmosphere valve 18 communicates with the atmosphere through an atmosphere passage 22 formed in the valve body 3 and a filter 23 disposed therein.

The rear end of the valve plunger 11 is pivotally connected with a distal end of an input shaft 24, and a spring 25 having a greater resilience than the spring 13 is disposed between the valve body 3 and the input shaft 24.

As a consequence, in the inoperative condition of the brake booster 1 shown in FIG. 1, the atmosphere valve 18 is closed while the vacuum valve 15 is open. It is to be noted that the other end of the input shaft 24 is mechanically coupled to a brake pedal, not shown. In this inoperative condition, the constant pressure chamber A and the variable pressure chamber B communicate with each other, and the negative pressure is introduced into the both chambers A and B.

A key member 26, which is known in itself, extends into the valve body 3 and is engaged with the valve plunger 11, thereby preventing the valve plunger 11 from being disengaged rearwardly from the valve body 3.

An output shaft 27 is disposed in the constant pressure chamber A, and has one end 27A in which a recess 27a is formed to receive a reaction disc 28.

The recess 27a of the output shaft 27 having the reaction disc 28 fitted therein is slidably fitted around the outer periphery of an annular projection 3a formed on the valve body 3 while the outer peripheral surface of the end 27A of the output shaft 27 is slidably fitted into the inner periphery which is located adjacent to and forwardly of the annular projection 3a. The reaction disc 28 received in the recess 27a is disposed in abutment against the end face of the annular projection 3a. In this manner, the reaction disc 28 and the front end face of the valve plunger 11 which is located adjacent to, but rearward of the reaction disc 28 oppose each other at a close spacing therebetween.

A retainer 31 is fitted to cover the outer periphery of the output shaft 27 from the front side, and is disposed in abutment against a stepped end face of the valve body 3. A return spring 32 is disposed between the retainer 31 and the front wall of the shell 2 for maintaining the members including the valve body 6 in the inoperative positions shown.

The front end of the output shaft 27 is mechanically coupled to a piston of a master cylinder, not shown. The shell 2 is formed with an opening 2b, and an annular seal member 33, which is known in itself, is disposed between the opening 2b and the outer periphery of the output shaft 27 at its front end or the piston of the master cylinder to maintain a hermetic seal.

The described construction and a resulting operation remain unchanged from a conventional brake booster known in the art.

However, in the present embodiment, the inner periphery of the valve body 3 into which the end 27A of the output shaft 27 is fitted is improved.

Figure 2:
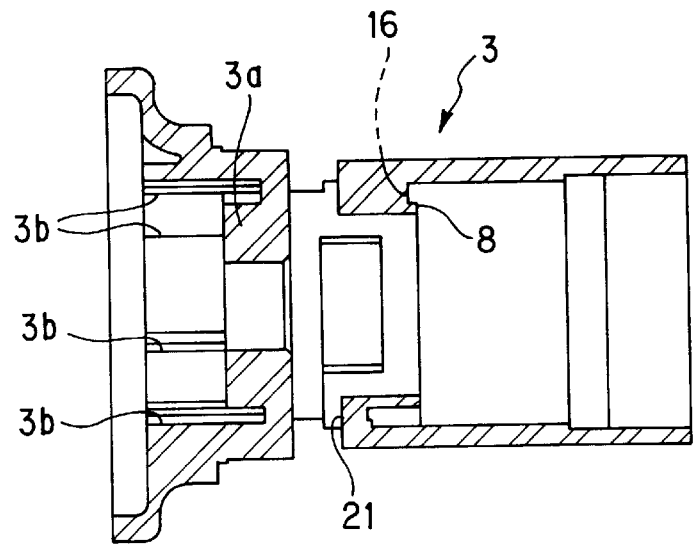
FIG. 2 is a cross section of a valve body shown in FIG. 1.
Figure 3:
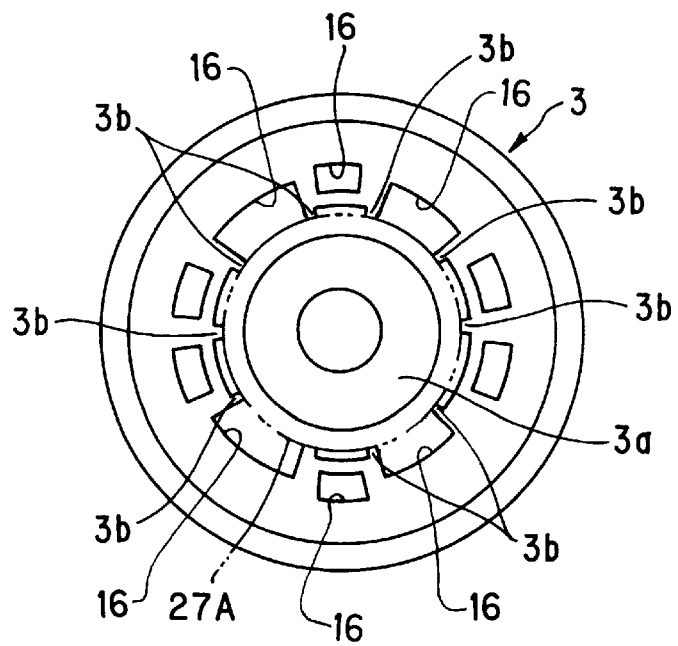
FIG. 3 is a left-hand side elevation of the valve body shown in FIG. 2.

Specifically, referring to FIGS. 2 and 3, in the valve body 3 of the present embodiment, a plurality of axially extending ribs 3b are formed around the inner periphery thereof at locations which are adjacent to, but forwardly of the annular projection 3a. These ribs 3b are disposed to be symmetrical with respect to the axis of the valve body 3. In this example, a total of ten ribs 3b are formed. The internal peripheral surface defined by these ten ribs 3b slidably supports the outer peripheral surface of the end 27A of the output shaft 27.

When the end 27A of the output shaft 27 is slidably fitted into the inner periphery defined by the ribs 3b formed on the valve body 3, any dimensional error which results from any diameter shrinkage which may occur in the internal diameter of the valve body 3 during the moulding of it with a synthetic resin can be suppressed small by the presence of the plurality of ribs 3b. Accordingly, when the end 27A of the output shaft 27 is slidably fitted into the ribs 3b, the axis of the output shaft 27 is less likely to be askew with respect to the axis of the valve body 3. Accordingly, if the outer periphery of the output shaft 27 at its front end slides with respect to the inner periphery of the annular seal member 33, a biased abrasion is less likely to occur on the annular seal member 33, thus allowing any leakage through the hermetic seal of the constant pressure chamber A due to the biased abrasion of the annular seal member 33 to be suppressed.

In the present embodiment, the ribs 3b (FIG. 3) are formed at locations which are symmetrical to each other with respect to the axis of the valve body 3. Accordingly, the axis of the output shaft 27 (FIG. 1) is less likely to be askew with respect to the axis of the valve body 3, again effectively suppressing the biased abrasion of the annular seal member 33. As seen in FIGS. 1 and 3, the passages 16 alternate circumferentially with the ribs 3b and ones of the passages 16 are axial grooves recessed in the valve body 3 adjacent corresponding ribs 3b and opening radially inward toward the stem portion 27A of the output shaft 27.

While the described embodiment represents an application of the invention to the brake booster 1 of single type, it should be understood that the invention is equally applicable to a brake booster of tandem or triple type which includes a plurality of sets of constant and variable pressure chambers A and B. While the invention has been illustrated when it is applied to the brake booster 1, it should also be understood that the invention is equally applicable to a clutch booster.

While the invention has been shown and described above in connection with a preferred embodiment thereof, it should be understood that a number of changes, substitutions and modifications are possible therein from the above disclosure without departing from the spirit and scope of the invention defined by the appended claims.

What is claimed is:

1. A brake booster comprising a substantially tubular valve body slidably disposed within a shell, and an output shaft having a rear end, the outer peripheral surface of which is slidably fitted into the inner periphery of the valve body at its front end, the inner periphery of the valve body being formed at its front end with a plurality of axially extending ribs, which ribs directly contact and slidably support the outer peripheral surface of the output shaft at said rear end.

2. A brake booster according to claim 1 in which the inner periphery of the valve body is formed at a location adjacent to, but rearward of the ribs with a forwardly extending annular projection, and the rear end of the output shaft is formed with a recess which receives a reaction disc, the recess formed at the rear end of the output shaft being slidably fitted around the annular projection on the valve body.

3. A brake booster according to claim 1 in which the plurality of ribs are disposed to be symmetrical to each other with respect to the axis of the valve body.

4. A brake booster according to claim 2 in which the plurality of ribs are disposed to be symmetrical to each other with respect to the axis of the valve body.

5. A brake booster according to claim 1 in which the shell includes constant and variable pressure chambers divided by a piston and in which the valve body includes at least one constant pressure passage therein, said constant pressure passage communicating with said constant pressure chamber.

6. A brake booster according to claim 5 in which said constant pressure passage extends axially in said valve body.

7. A brake booster according to claim 5 including a plurality of said constant pressure passages.

8. A brake booster according to claim 5 in which a said constant pressure passage is an axial groove recessed in said valve body adjacent a said rib.

\* \* \* \* \*